(12) United States Patent
Nakano

(10) Patent No.: US 12,466,240 B2
(45) Date of Patent: Nov. 11, 2025

(54) VEHICLE

(71) Applicant: HONDA MOTOR CO., LTD., Tokyo (JP)

(72) Inventor: Junichi Nakano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 18/125,423

(22) Filed: Mar. 23, 2023

(65) Prior Publication Data

US 2023/0311619 A1    Oct. 5, 2023

(30) Foreign Application Priority Data

Mar. 31, 2022   (JP) ................................ 2022-060290

(51) Int. Cl.
| | | |
|---|---|---|
| *B60H 1/32* | (2006.01) | |
| *B60H 1/00* | (2006.01) | |
| *B60K 5/00* | (2006.01) | |
| *B60K 11/04* | (2006.01) | |

(52) U.S. Cl.
CPC ....... *B60H 1/3229* (2013.01); *B60H 1/00407* (2013.01); *B60K 5/00* (2013.01); *B60K 11/04* (2013.01); *B60K 2005/003* (2013.01)

(58) Field of Classification Search
CPC .... B60H 1/3229; B60H 1/00407; B60K 5/00; B60K 11/04; B60K 11/02; B60K 2005/003
See application file for complete search history.

(56) References Cited

U.S. PATENT DOCUMENTS

| | | | | |
|---|---|---|---|---|
| 8,336,656 B2* | 12/2012 | Shiratori | ................ | B60K 13/02 |
| | | | | 180/68.1 |
| 8,794,370 B2* | 8/2014 | Hiramatsu | ........... | B62D 25/082 |
| | | | | 180/274 |
| 9,745,916 B2* | 8/2017 | Yokotani | ................. | F02F 1/242 |
| 10,988,187 B2* | 4/2021 | Schounard | ............ | B62D 31/00 |
| 2013/0081595 A1 | 4/2013 | Yokotani et al. | | |

FOREIGN PATENT DOCUMENTS

| | | | |
|---|---|---|---|
| JP | 2013-072419 A | | 4/2013 |
| JP | 2019147423 A | * | 9/2019 |

* cited by examiner

*Primary Examiner* — John D Walters
(74) *Attorney, Agent, or Firm* — Paratus Law Group, PLLC

(57) ABSTRACT

A vehicle includes a prime mover provided behind a front room and below a floor panel, a propeller shaft extending in front of the prime mover and below the floor panel in a front-rear direction and configured to transmit rotational power output from the prime mover, an air conditioner unit that is provided in the front room and through which a first refrigerant flows, a compressor driven by power of the prime mover and configured to compress the first refrigerant, and a first pipe that connects the air conditioner unit and the compressor and through which the first refrigerant flows. The floor panel is formed with a center tunnel portion formed by bending the floor panel upward in a convex shape. A space in which the propeller shaft is provided is formed below the center tunnel portion. The first pipe extends through the space in the front-rear direction.

14 Claims, 5 Drawing Sheets

VEHICLE

CROSS-REFERENCE TO RELATED APPLICATIONS

The present application claims the benefit of priority of Japanese Patent Application No. 2022-060290, filed on Mar. 31, 2022, the content of which is incorporated herein by reference.

TECHNICAL FIELD

The present invention relates to a vehicle.

BACKGROUND ART

In the related art, a vehicle is know-n in which a prime mover is provided behind a front room and below a floor panel. For example, a vehicle in which a prime mover is provided below a floor panel and below a seat is disclosed in JP2013-072419A.

SUMMARY OF INVENTION

However, when a cooling device that air-conditions the interior of a vehicle cabin is attached to the vehicle disclosed in JP2013-072419A, it is necessary to provide an air conditioner unit in a front room, to attach a compressor that is driven by power of the prime mover to compress a refrigerant in the vicinity of the prime mover, and to provide a refrigerant pipe that connects the prime mover and the air conditioner unit to circulate the refrigerant. Therefore, a space for providing the refrigerant pipe may be required, and the vehicle cabin may be reduced.

The present environment provides a vehicle in which space efficiency can be improved and a vehicle cabin can be enlarged.

The present environment provides a vehicle including:
a front wheel and a rear wheel;
a vehicle cabin;
a floor panel constituting a floor surface of the vehicle cabin;
a front room provided in front of the vehicle cabin;
a prime mover provided behind the front room and below the floor panel;
a propeller shaft extending in front of the prime mover and below the floor panel in a front-rear direction and configured to transmit rotational power output from the prime mover;
an air conditioner unit that is provided in the front room and through which a first refrigerant flows;
a compressor driven by power of the prime mover and configured to compress the first refrigerant; and
a first pipe that connects the air conditioner unit and the compressor and through which the first refrigerant flows,
in which the floor panel is formed with a center tunnel portion formed by bending the floor panel upward in a convex shape,
in which a space in which the propeller shaft is provided is formed below the center tunnel portion, and
in which the first pipe extends through the space in the front-rear direction.

According to the present invention, since the first pipe can be provided by effectively utilizing the space in which the propeller shaft is provided, the space efficiency of the vehicle can be improved, and the vehicle cabin can be enlarged.

BRIEF DESCRIPTION OF DRAWINGS

Exemplary embodiment(s) of the present invention will be described in detail based on the following figures, wherein.

DESCRIPTION OF EMBODIMENTS

Figure 1:
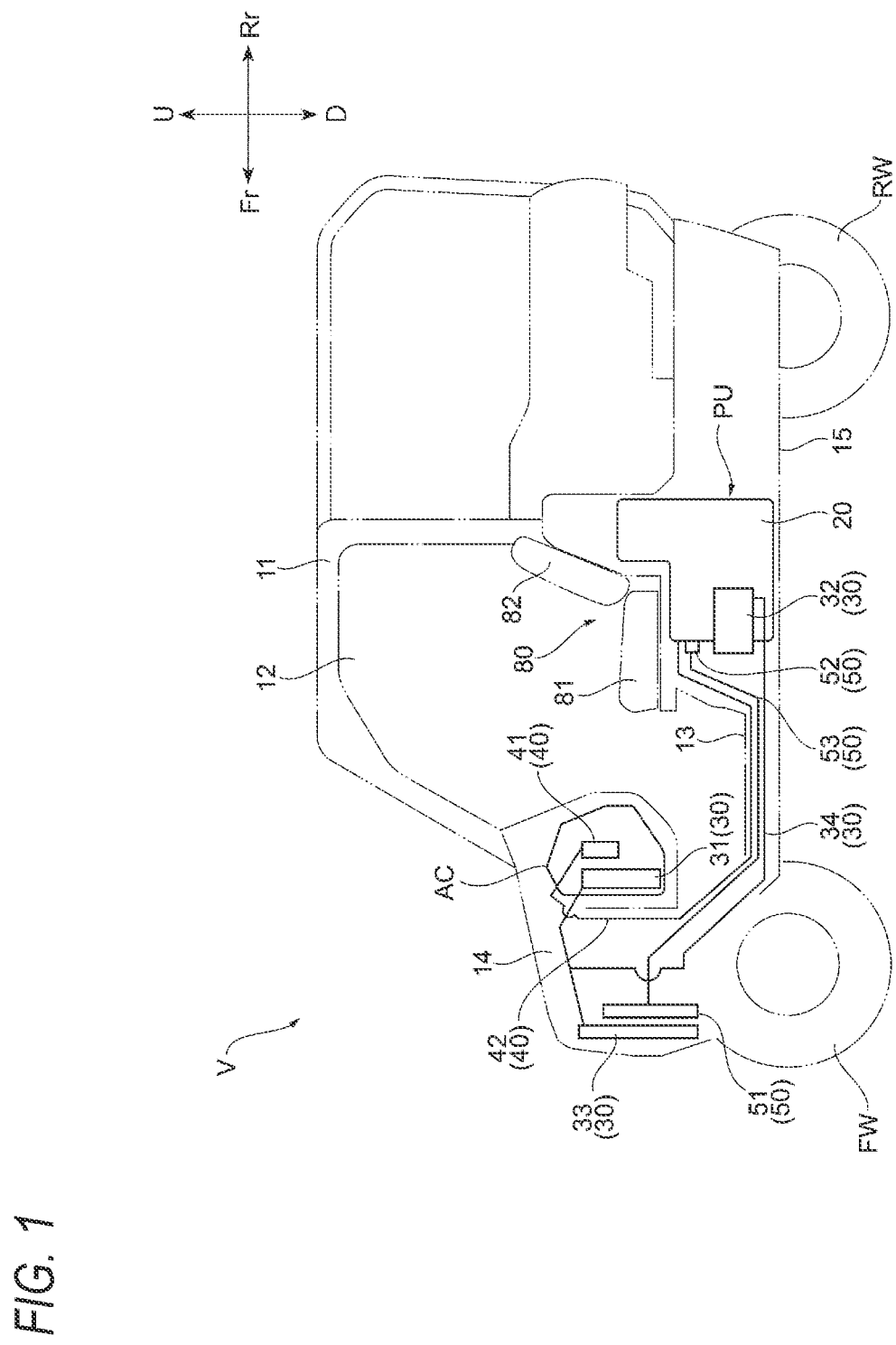
FIG. 1 is a left side view of a vehicle according to an exemplary embodiment of the present invention.

Hereinafter, an embodiment of a vehicle according to the present invention will be described with reference to the accompanying drawings. The drawings are viewed in directions of reference signs. In the present specification and the like, in order to simplify and clarify the description, a front-rear direction, a left-right direction, and an upper-lower direction are described according to directions viewed from a driver of the vehicle. In the drawings, a front side of the vehicle is denoted by Fr, a rear side of the vehicle is denoted by Rr, a left side of the vehicle is denoted by L, a right side of the vehicle is denoted by R, an upper side of the vehicle is denoted by U, and a lower side of the vehicle is denoted by D.

<Vehicle>

As shown in FIG. 1, a vehicle V on which a power unit according to the present embodiment is mounted is, for example, a rough road traveling vehicle capable of traveling on a rough road. The vehicle V includes a front wheel FW and a rear wheel RW, a vehicle body frame 11, a vehicle cabin 12 surrounded by the vehicle body frame 11, a floor panel 13 forming a floor surface of the vehicle cabin 12, and a front room 14 formed in front of the vehicle cabin 12. A power unit PU including an internal combustion engine 20 that drives the front wheel FW, a cooling device 30 that cools the interior of the vehicle cabin 12, a heating device 40 that heats the interior of the vehicle cabin 12, and an internal combustion engine cooling device 50 that cools the internal combustion engine 20 of the power unit PU are mounted on the vehicle V.

The cooling device 30 includes an evaporator 31, a compressor 32, a condenser 33, and an expansion valve (not shown). The cooling device 30 further includes a cooling refrigerant pipe 34 through which a cooling refrigerant circulates through the evaporator 31, the compressor 32, the condenser 33, and the expansion valve (not shown). The cooling refrigerant flows through the cooling refrigerant pipe 34. The cooling refrigerant flows through the cooling refrigerant pipe 34 and circulates through the evaporator 31, the compressor 32, the condenser 33, and the expansion valve (not shown).

The cooling refrigerant is compressed by the compressor 32 and heated, and then is cooled by the condenser 33 exchanging heat with the outside air. Then, the cooling refrigerant expands by the expansion valve, further lowers in temperature, and is supplied to the evaporator 31. Then, the air passing through the evaporator by a fan or the like is cooled by the cooling refrigerant flowing through the evaporator and is supplied to the vehicle cabin 12. The cooling refrigerant flowing through the evaporator 31 returns to the compressor 32.

The internal combustion engine cooling device 50 includes a radiator 51 and a water pump 52. The internal combustion engine cooling device 50 further includes an internal combustion engine coolant pipe 53 through which an internal combustion engine coolant circulates through the internal combustion engine 20, the radiator 51, and the water pump 52. Therefore, the internal combustion engine coolant pipe 53 connects the internal combustion engine 20, the radiator 51, and the water pump 52. The internal combustion engine coolant flows through the internal combustion engine coolant pipe 53. The internal combustion engine coolant flows through the internal combustion engine coolant pipe 53 and circulates through the internal combustion engine 20, the radiator 51, and the water pump 52.

The internal combustion engine coolant is cooled by exchanging heat with the outside air in the radiator 51, and is pressure-fed into the internal combustion engine 20 by the water pump 52. Then, the internal combustion engine coolant pressure-fed by the water pump 52 flows inside the internal combustion engine 20, absorbs heat of the internal combustion engine 20, cools the internal combustion engine 20, and returns to the radiator 51 again.

The heating device 40 includes a heater core 41. The heating device 40 further includes a heating liquid pipe 42 through which a heating liquid circulates through the internal combustion engine 20 and the heater core 41. A valve device (not shown) is provided in the heating liquid pipe 42.

When the valve device (not shown) of the heating device 40 is opened, the internal combustion engine coolant of the internal combustion engine cooling device 50, which has cooled the internal combustion engine 20 and has been heated, flows into the heating liquid pipe 42, flows through the heating liquid pipe 42, and is supplied to the heater core 41. Then, the air passing through the heater core 41 by a fan or the like is heated by the internal combustion engine coolant flowing through the heater core 41 and is supplied to the vehicle cabin 12. The internal combustion engine coolant flowing through the heater core 41 returns to the internal combustion engine 20.

The evaporator 31 of the cooling device 30 and the heater core 41 of the heating device 40 are accommodated in an air conditioner unit AC provided in the front room 14 in a manner of being adjacent to a front portion of the vehicle cabin 12. In other words, the air conditioner unit AC includes the evaporator 31 of the cooling device 30 and the heater core 41 of the heating device 40. Further, the cooling refrigerant pipe 34 connects the evaporator 31 of the air conditioner unit AC to the compressor 32. The heating liquid pipe 42 connects the heater core 41 of the air conditioner unit AC to the internal combustion engine 20.

The power unit PU is a unit in which the internal combustion engine 20, the compressor 32 of the cooling device 30 described above, and the water pump 52 of the internal combustion engine cooling device 50 described above are modularized. Both the compressor 32 of the cooling device 30 and the water pump 52 of the internal combustion engine cooling device 50 are driven by rotational power generated in the internal combustion engine 20.

The condenser 33 of the cooling device 30 and the radiator 51 of the internal combustion engine cooling device 50 are provided in the front portion of the front room 14.

The internal combustion engine 20 and the water pump 52 of the power unit PU, and the compressor 32 are provided below the floor panel 13 behind the front room 14.

The cooling refrigerant pipe 34 of the cooling device 30, the internal combustion engine coolant pipe 53 of the internal combustion engine cooling device 50, and the heating liquid pipe 42 of the heating device 40 extend below the floor panel 13 in a front-rear direction.

The vehicle V further includes an under panel 15 that covers, from below, the internal combustion engine 20 and the water pump 52 of the power unit PU, the compressor 32, the cooling refrigerant pipe 34 of the cooling device 30, the internal combustion engine coolant pipe 53 of the internal combustion engine cooling device 50, and the heating liquid pipe 42 of the heating device 40. The under panel 15 is formed of a rigid member such as metal. Accordingly, the strength of a lower portion of the vehicle V can be improved by the under panel 15, and dust, water, and the like from below can be prevented from entering the internal combustion engine 20 and the water pump 52 of the power unit PU, the compressor 32, the cooling refrigerant pipe 34 of the cooling device 30, the internal combustion engine coolant pipe 53 of the internal combustion engine cooling device 50, and the heating liquid pipe 42 of the heating device 40.

Figure 2:
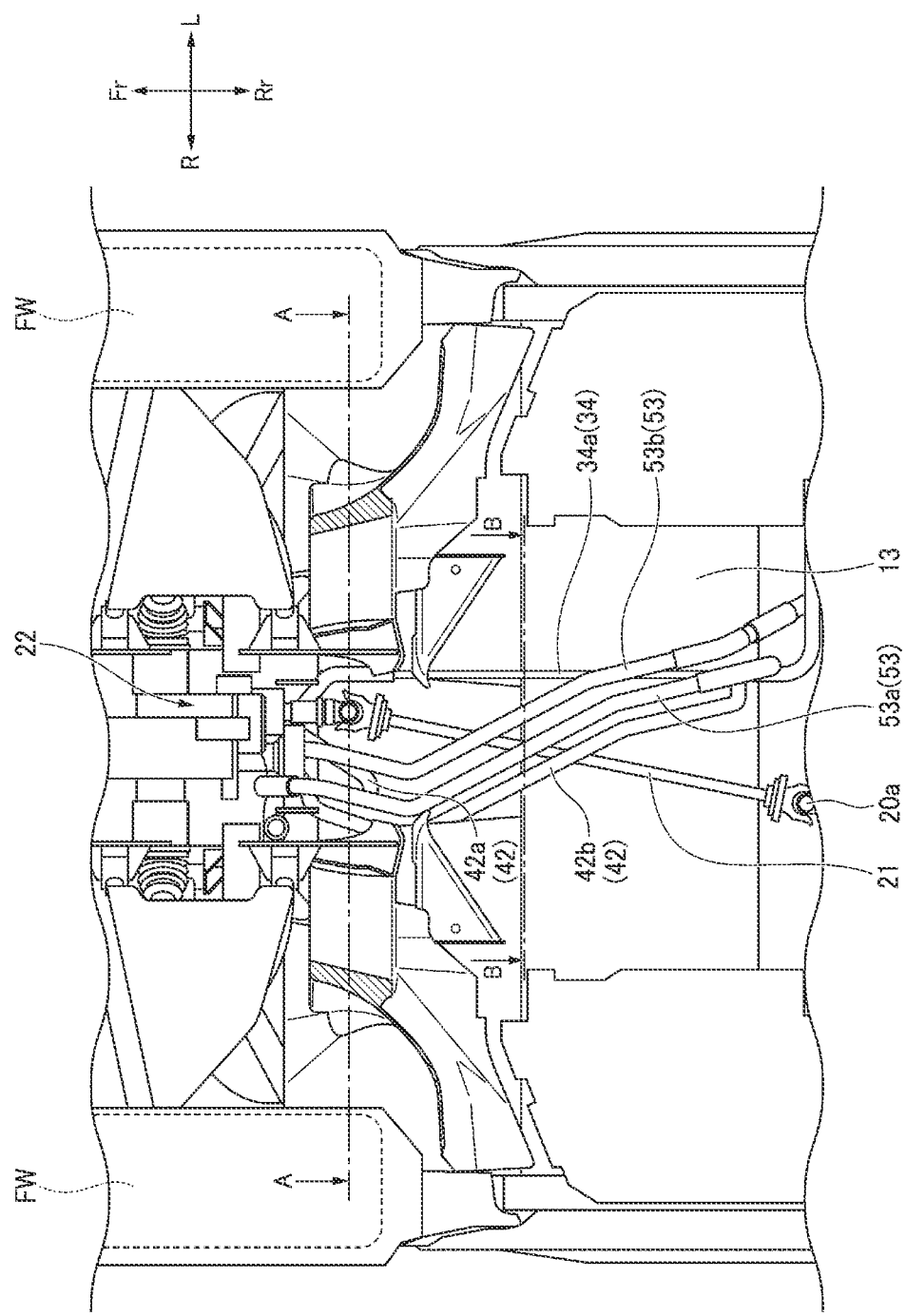
FIG. 2 is a bottom view of the vehicle in FIG. 1 with an under panel removed.

As shown in FIG. 2, the vehicle V further includes a propeller shaft 21 configured to transmit the rotational power output from the internal combustion engine 20 forward. The propeller shaft 21 extends, in the front-rear direction, below the floor panel 13 in front of the internal combustion engine 20. A rear end of the propeller shaft 21 is coupled to an output shaft 20a of the internal combustion engine 20, and a front end of the propeller shaft 21 is coupled to a transaxle device 22 provided in the front room 14. The transaxle device 22 is a device in which a transmission, a differential device, and an axle are integrated. The left and right front wheels FW are attached to a front end of the axle of the transaxle device 22.

The output shaft 20a of the internal combustion engine 20 is provided at a position offset from a center of the vehicle V in a vehicle width direction to a right side in the vehicle width direction. The propeller shaft 21 extends forward in a substantially straight line in the front-rear direction while being inclined leftward in the vehicle width direction.

The floor panel 13 is formed with a center tunnel portion 13a formed by bending the floor panel 13 upward in a convex shape. Further, a space SP is formed below the center tunnel portion 13a of the floor panel 13. The space SP is a region from a left end to a right end of the center tunnel portion 13a in a left-right direction, and is a region below the floor panel 13 at a portion where the center tunnel portion 13a is formed in an upper-lower direction. Therefore, the space SP may extend to below the floor panel 13 at a portion where the center tunnel portion 13a is not formed in the upper-lower direction.

The propeller shaft 21 is provided in the space SP and extends through the space SP in the front-rear direction.

The cooling refrigerant pipe 34 includes a compressed refrigerant supply portion 34a through which the cooling refrigerant compressed and heated by the compressor 32 flows toward the condenser 33 in the front room 14, and a refrigerant return portion 34b through which the cooling refrigerant flowing through the evaporator 31 flows from the air conditioner unit AC in the front room 14 toward the compressor 32.

Both the compressed refrigerant supply portion 34a and the refrigerant return portion 34b of the cooling refrigerant pipe 34 extend through the space SP in the front-rear direction.

Accordingly, the space SP in which the propeller shaft 21 is provided can be effectively utilized to provide the cooling refrigerant pipe 34. Therefore, the space efficiency of the vehicle V can be improved, and the vehicle cabin 12 can be enlarged.

The internal combustion engine coolant pipe 53 includes a supply portion 53a through which the internal combustion engine coolant cooled by the radiator 51 provided in the front room 14 flows from the radiator 51 to the internal combustion engine 20, and a discharge portion 53b through which the internal combustion engine coolant that has cooled the internal combustion engine 20 and that has been heated by the internal combustion engine 20 flows from the internal combustion engine 20 to the radiator 51 provided in the front room 14.

The heating liquid pipe 42 includes a return portion 42a through which the internal combustion engine coolant flowing through the heater core 41 flows from the air conditioner unit AC in the front room 14 toward the internal combustion engine 20, and a supply portion 42b through which the internal combustion engine coolant that has cooled the internal combustion engine 20 and that has been heated by the internal combustion engine 20 flows from the internal combustion engine 20 to the heater core 41 provided in the air conditioning unit AC in the front room 14. In the present embodiment, the return portion 42a merges with the supply portion 53a of the internal combustion engine coolant pipe 53. The supply portion 42b connects the heater core 41 and the internal combustion engine 20.

Rear end portions of the internal combustion engine coolant pipe 53 and the heating fluid pipe 42 are located on a left side in the vehicle width direction with respect to the center of the vehicle V in the vehicle width direction. On the other hand, front end portions of the internal combustion engine coolant pipe 53 and the heating fluid pipe 42 of the heating device 40 are located on the right side in the vehicle width direction with respect to the center of the vehicle V in the vehicle width direction.

When viewed from below, the internal combustion engine coolant pipe 53 and the heating fluid pipe 42 pass below the propeller shaft 21 and the cooling refrigerant pipe 34, cross the propeller shaft 21, and extend from the rear end portion toward the front end portion in the front-rear direction.

More specifically, the rear end portions of the supply portion 53a and the discharge portion 53b of the internal combustion engine coolant pipe 53, and the rear end portions of the return portion 42a and the supply portion 42b of the heating fluid pipe 42 are all located on the left side in the vehicle width direction with respect to the center of the vehicle V in the vehicle width direction. On the other hand, the front end portions of the supply portion 53a and the discharge portion 53b of the internal combustion engine coolant pipe 53, and the front end portions of the return portion 42a and the supply portion 42b of the heating fluid pipe 42 are all located on the right side in the vehicle width direction with respect to the center of the vehicle V in the vehicle width direction.

When viewed from below, the supply portion 53a and the discharge portion 53b of the internal combustion engine coolant pipe 53, and the return portion 42a and the supply portion 42b of the heating fluid pipe 42 pass below the propeller shaft 21 and the cooling refrigerant pipe 34, cross the propeller shaft 21, and extend from the rear end portion toward the front end portion in the front-rear direction.

Figure 3:
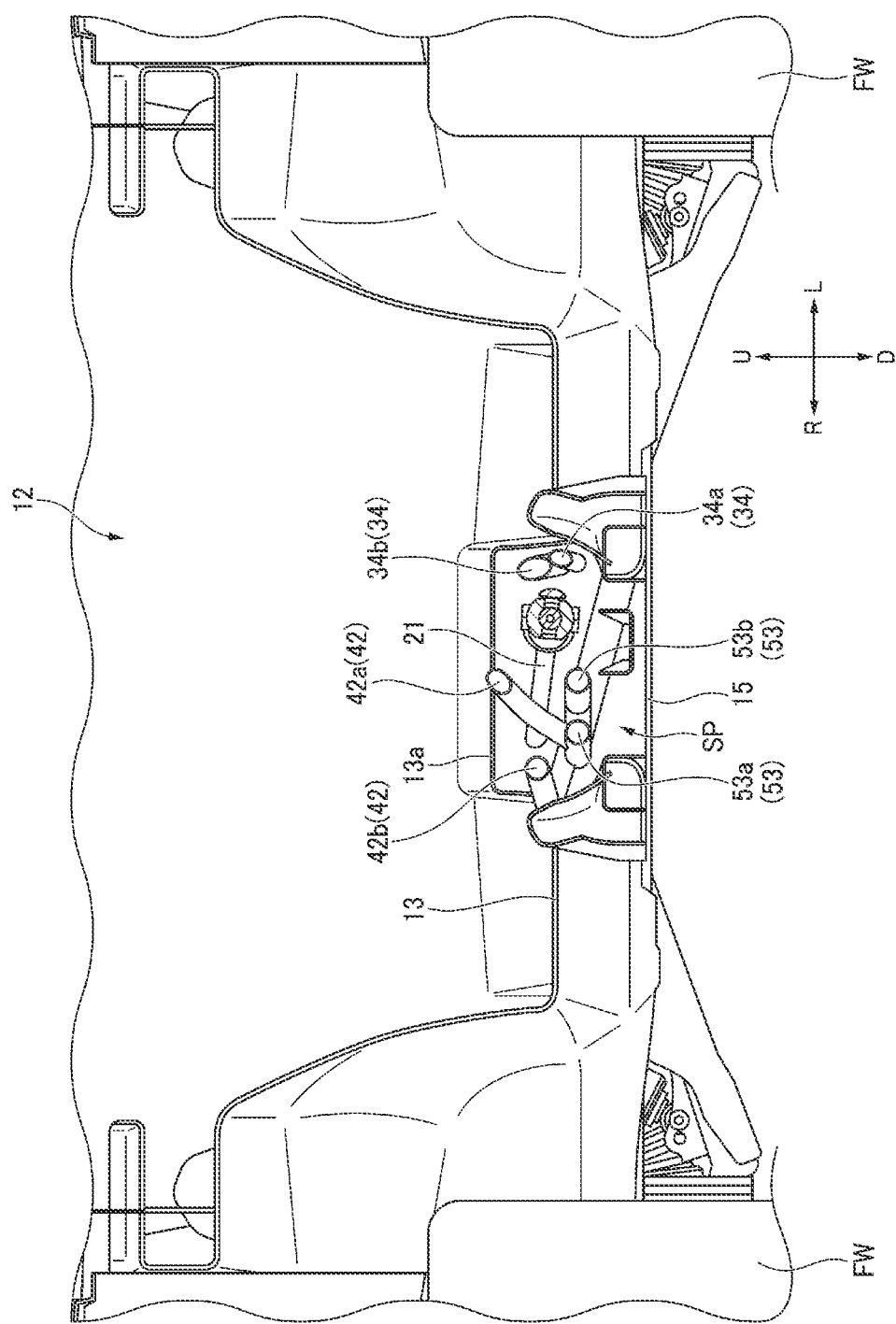
FIG. 3 is a cross-sectional view taken along a line A-A in FIG. 2.

As shown in FIG. 3, in a predetermined A-A cross section that traverses at least a part of the propeller shaft 21 in the vehicle width direction, the cooling refrigerant pipe 34 is located on the left side of the propeller shaft 21 in the space SP in the vehicle width direction, and the internal combustion engine coolant pipe 53 and the heating liquid pipe 42 are located on the right side of the propeller shaft 21 in the space SP in the vehicle width direction.

Accordingly, the space SP in which the propeller shaft 21 is provided can be effectively utilized to provide a plurality of pipes. Therefore, the space efficiency of the vehicle V can be further improved, and the vehicle cabin 12 can be further enlarged.

Further, by providing the cooling refrigerant pipe 34 and the internal combustion engine coolant pipe 53 separately on one side and the other side across the propeller shaft 21 in the vehicle width direction, it is possible to prevent the cooling refrigerant pipe 34 from being affected by the heat of the internal combustion engine coolant flowing through the internal combustion engine coolant pipe 53.

Similarly, by providing the cooling refrigerant pipe 34 and the heating liquid pipe 42 separately on one side and the other side across the propeller shaft 21 in the vehicle width direction, it is possible to prevent the cooling refrigerant pipe 34 from being affected by the heat of the internal combustion engine coolant flowing through the heating liquid pipe 42.

Further, in the present embodiment, the supply portion 53a and the discharge portion 53b of the internal combustion engine coolant pipe 53 extend in the front-rear direction side by side in the vehicle width direction, with the supply portion 53a on the right side in the vehicle width direction and the discharge portion 53b on the left side in the vehicle width direction. Accordingly, it is possible to further prevent the cooling refrigerant pipe 34 from being affected by the heat of the high-temperature internal combustion engine coolant flowing through the discharge portion 53b of the internal combustion engine coolant pipe 53.

In the present embodiment, since the propeller shaft 21 is inclined to the left side in the vehicle width direction toward the front and extends substantially linearly in the front-rear direction, the space SP in which the propeller shaft 21 is provided needs to have a predetermined dimension in the vehicle width direction according to the degree of inclination of the propeller shaft 21. Even in this case, the space SP in which the propeller shaft 21 is provided can be effectively utilized to provide a plurality of pipes. Therefore, the space efficiency of the vehicle V can be further improved, and the vehicle cabin 12 can be further enlarged.

Figure 4:
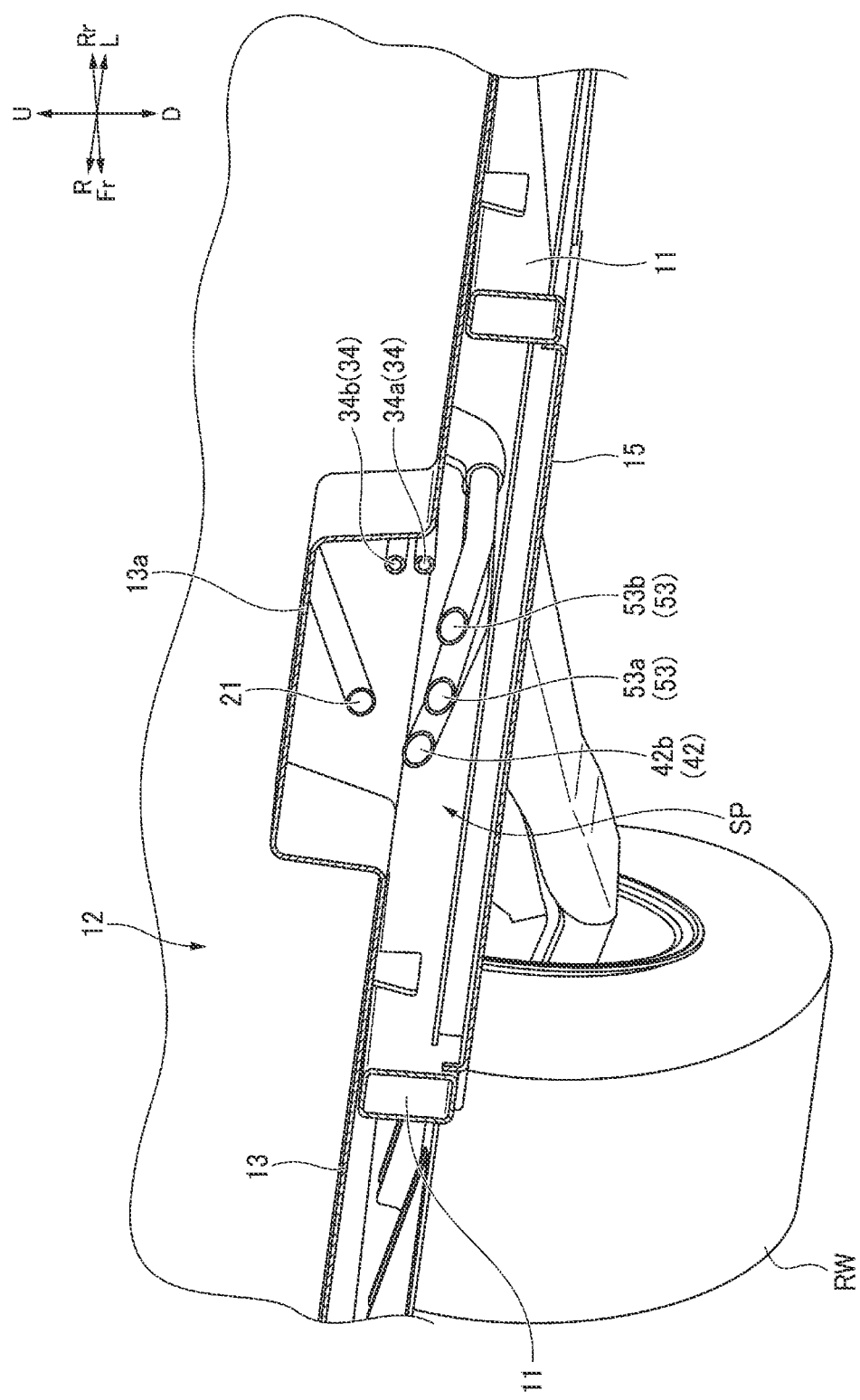
FIG. 4 is a cross-sectional view taken along a line B-B in FIG. 2.

As shown in FIG. 4, in a predetermined B-B cross section that traverses at least a part of the propeller shaft 21 in the vehicle width direction, the propeller shaft 21 and the cooling refrigerant pipe 34 are arranged side by side in the space SP in the vehicle width direction. In the present embodiment, in the B-B cross section, the compressed refrigerant supply portion 34a and the refrigerant return portion 34b of the cooling refrigerant pipe 34 are both provided on the left side of the propeller shaft 21 in the space SP in the vehicle width direction. That is, in the B-B cross section, the propeller shaft 21 and the cooling refrigerant pipe 34 are arranged side by side in the space SP in the vehicle width direction such that the propeller shaft 21 is on the right side in the vehicle width direction and the cooling refrigerant pipe 34 is on the left side in the vehicle width direction.

Accordingly, since a protruding height of the center tunnel portion 13a to an upper side can be reduced, the space efficiency of the vehicle V is further improved, and the vehicle cabin 12 can be further enlarged.

In the present embodiment, the compressed refrigerant supply portion 34a and the refrigerant return portion 34b of the cooling refrigerant pipe 34 are located on the left side of the propeller shaft 21 in the vehicle width direction, and are arranged side by side in the space SP in the upper-lower direction. More specifically, the compressed refrigerant supply portion 34a and the refrigerant return portion 34b of the cooling refrigerant pipe 34 are arranged side by side in the space SP in the upper-lower direction such that the compressed refrigerant supply portion 34a is located at the lower side and the refrigerant return portion 34b is located at the upper side.

Figure 5:
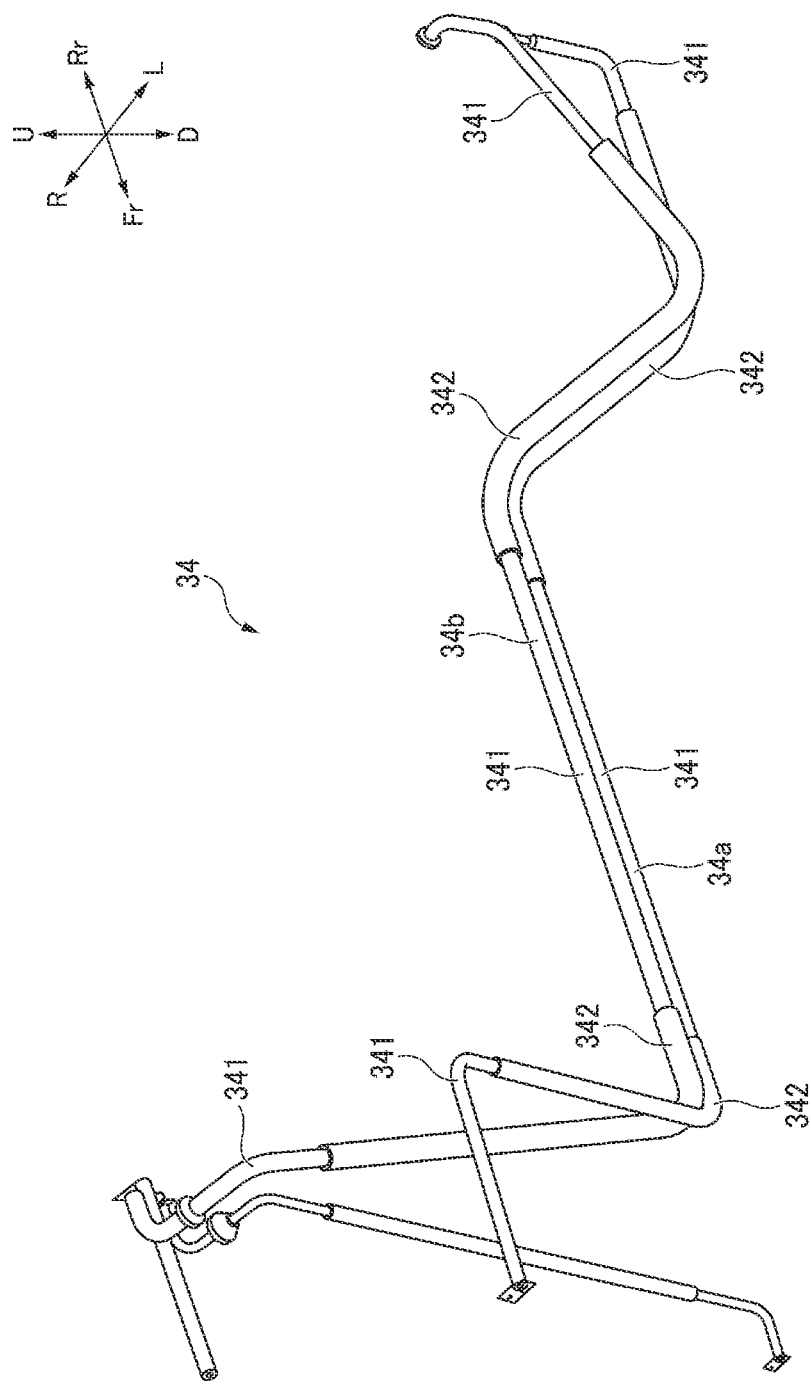
FIG. 5 is a view showing a cooling refrigerant pipe in the vehicle in FIG. 1.

As shown in FIG. 5, the cooling refrigerant pipe 34 includes a rigid portion 341 formed of metal and an elastic portion 342 formed of an elastic member. The rigid portion 341 is formed of, for example, aluminum. The elastic portion 342 is formed of, for example, synthetic rubber. A combination of the rigid portion 341 and the elastic portion 342 is not limited to a combination of aluminum and synthetic rubber, and may be a combination of the rigid portion 341 formed of any metal and the elastic portion 342 formed of any elastic member.

In the present embodiment, in the cooling refrigerant pipe 34, a portion of the cooling refrigerant pipe 34 extending in the space SP in the front-rear direction is the rigid portion 341. Accordingly, the cost of the cooling refrigerant pipe 34 can be reduced, and the rigidity of the portion of the cooling refrigerant pipe 34 extending in the space SP in the front-rear direction can be secured. Therefore, the number of locations where the cooling refrigerant pipe 34 is fixed to the vehicle V below the floor panel 13 can be reduced. The cooling refrigerant pipe 34 includes the elastic portion 342, so that the cooling refrigerant pipe 34 can be easily connected to the compressor 32, the condenser 33, and the evaporator 31 by deforming the elastic portion 342. Therefore, assemble ability of the cooling refrigerant pipe 34 is improved.

Although one embodiment of the present invention has been described above with reference to the accompanying drawings, it is needless to say that the present invention is not limited to the embodiment. It is apparent that those skilled in the art can conceive of various modifications and alterations within the scope described in the claims, and it is also understood that such modifications and alterations naturally fall within the technical scope of the present invention. The constituent elements in the embodiment described above may be combined freely within a range not departing from the spirit of the invention.

In the present description, at least the following matters are described. In the parentheses, the corresponding constituent elements and the like in the above-described embodiment are shown as an example, and the present invention is not limited thereto.

(1) A vehicle (a vehicle V) including:
   a front wheel (a front wheel FW) and a rear wheel (a rear wheel RW);
   a vehicle cabin (a vehicle cabin 12);
   a floor panel (a floor panel 13) constituting a floor surface of the vehicle cabin;
   a front room (a front room 14) provided in front of the vehicle cabin;
   a prime mover (an internal combustion engine 20) provided behind the front room and below the floor panel;
   a propeller shaft (a propeller shaft 21) extending in front of the prime mover and below the floor panel in a front-rear direction and configured to transmit rotational power output from the prime mover;
   an air conditioner unit (an air conditioner unit AC) that is provided in the front room and through which a first refrigerant flows;
   a compressor (a compressor 32) driven by power of the prime mover and configured to compress the first refrigerant; and
   a first pipe (a cooling refrigerant pipe 34) that connects the air conditioner unit and the compressor and through which the first refrigerant flows,
   in which the floor panel is formed with a center tunnel portion (a center tunnel portion 13a) formed by bending the floor panel upward in a convex shape,
   in which a space (a space SP) in which the propeller shaft is provided is formed below the center tunnel portion, and
   in which the first pipe extends through the space in the front-rear direction.

According to (1), since the first pipe can be provided by effectively utilizing the space in which the propeller shaft is provided, the space efficiency of the vehicle can be improved, and the vehicle cabin can be enlarged.

(2) The vehicle according to (1),
   in which the vehicle further includes a second pipe (an internal combustion engine coolant pipe 53) extending below the floor panel in the front-rear direction, and
   in which, in a first predetermined cross section that traverses at least a part of the propeller shaft in a vehicle width direction,
      the first pipe is located on one side of the propeller shaft in the space in the vehicle width direction, and
      the second pipe is located on the other side of the propeller shaft in the space in the vehicle width direction.

According to (2), since the first pipe and the second pipe can be provided by effectively utilizing the space in which the propeller shaft is provided in the vehicle width direction, the space efficiency of the vehicle can be further improved, and the vehicle cabin can be further enlarged.

(3) The vehicle according to (2),
   in which the vehicle further includes a radiator (a radiator 51) provided in the front room, and
   in which the second pipe connects the prime mover to the radiator.

According to (3), by providing the first pipe and the second pipe separately on one side and the other side across the propeller shaft in the vehicle width direction, it is possible to prevent the first pipe from being affected by the heat of the fluid flowing through the second pipe.

(4) The vehicle according to (2) or (3),
   in which the vehicle further includes a third pipe (a heating liquid pipe 42) extending below the floor panel in the front-rear direction, and
   in which, in the first predetermined cross section, the third pipe is located on the other side of the propeller shaft in the space in the vehicle width direction.

According to (4), since the first pipe, the second pipe, and the third pipe can be provided by effectively utilizing the space in which the propeller shaft is provided in the vehicle width direction, the space efficiency of the vehicle can be further improved, and the vehicle cabin can be further enlarged.

(5) The vehicle according to (4),
in which the air conditioner unit includes an evaporator (an evaporator 31) and a heater core (a heater core 41),
in which the first pipe connects the evaporator and the compressor, and
in which the third pipe connects the heater core to the prime mover.

According to (5), by providing the first pipe and the third pipe separately on one side and the other side across the propeller shaft in the vehicle width direction, it is possible to prevent the first pipe from being affected by the heat of the fluid flowing through the third pipe.

(6) The vehicle according to any one of (1) to (5),
in which an output shaft (an output shaft 20a) configured to output a driving force from the prime mover is provided at a position offset by a predetermined distance from a center of the vehicle in the vehicle width direction, and
in which the propeller shaft is inclined in the vehicle width direction and extends in the front-rear direction.

According to (6), even when the propeller shaft is inclined in the vehicle width direction and extends in the front-rear direction, since the first pipe can be provided by effectively utilizing the space in which the propeller shaft is provided in the vehicle width direction, the space efficiency of the vehicle can be further improved, and the vehicle cabin can be further enlarged.

(7) The vehicle according to any one of (1) to (6),
in which, in a second predetermined cross section that traverses at least a part of the propeller shaft in a vehicle width direction, the propeller shaft and the first pipe are arranged side by side in the space in the vehicle width direction.

According to (7), since a protruding height of the center tunnel portion to an upper side can be reduced, the space efficiency of the vehicle is further improved, and the vehicle cabin can be further enlarged.

(8) The vehicle according to any one of (1) to (7),
in which the first pipe includes a rigid portion (a rigid portion 341) formed of metal and an elastic portion (an elastic portion 342) formed of an elastic member.

According to (8), since the cost of the first pipe can be reduced and the rigidity of a predetermined portion can be secured in the first pipe, it is possible to reduce the number of locations where the first pipe is fixed to the vehicle. The first pipe includes the elastic portion, so that the first pipe can be easily connected to a device to which the first pipe is to be connected by deforming the elastic portion. Therefore, assemblability of the first pipe is improved.

(9) The vehicle according to any one of (1) to (8),
in which the vehicle further includes a lower cover member (an under panel 15) formed of a rigid member that covers the space from below.

According to (9), the strength of a lower portion of the vehicle can be improved by the lower cover member, and dust, water, and the like can be prevented from entering the first pipe from below.

What is claimed is:
1. A vehicle comprising:
a front wheel and a rear wheel;
a vehicle cabin;
a floor panel constituting a floor surface of the vehicle cabin;
a front room provided in front of the vehicle cabin;
a prime mover provided behind the front room and below the floor panel;
a propeller shaft extending in front of the prime mover and below the floor panel in a front-rear direction and configured to transmit rotational power output from the prime mover;
an air conditioner unit that is provided in the front room and through which a first refrigerant flows;
a compressor driven by power of the prime mover and configured to compress the first refrigerant; and
a first pipe that connects the air conditioner unit and the compressor and through which the first refrigerant flows,
wherein the floor panel is formed with a center tunnel portion formed by bending the floor panel upward in a convex shape,
wherein a space in which the propeller shaft is provided is formed below the center tunnel portion,
wherein the first pipe extends through the space in the front-rear direction, and
wherein, in a predetermined cross section that traverses at least a part of the propeller shaft in a vehicle width direction, the propeller shaft and the first pipe are arranged side by side in the space in the vehicle width direction.

2. The vehicle according to claim 1,
wherein the vehicle further includes a second pipe extending below the floor panel in the front-rear direction, and
wherein, in another predetermined cross section that traverses at least a part of the propeller shaft in the vehicle width direction,
the first pipe is located on one side of the propeller shaft in the space in the vehicle width direction, and
the second pipe is located on the other side of the propeller shaft in the space in the vehicle width direction.

3. The vehicle according to claim 2,
wherein the vehicle further includes a radiator provided in the front room, and
wherein the second pipe connects the prime mover to the radiator.

4. The vehicle according to claim 2,
wherein the vehicle further includes a third pipe extending below the floor panel in the front-rear direction, and
wherein, in the another predetermined cross section, the third pipe is located on the other side of the propeller shaft in the space in the vehicle width direction.

5. The vehicle according to claim 4,
wherein the air conditioner unit includes an evaporator and a heater core,
wherein the first pipe connects the evaporator and the compressor, and
wherein the third pipe connects the heater core to the prime mover.

6. The vehicle according to claim 1,
wherein the first pipe includes a rigid portion formed of metal and an elastic portion formed of an elastic member.

7. The vehicle according to claim 1,
wherein the vehicle further includes a lower cover member formed of a rigid member that covers the space from below.

8. A vehicle comprising:
a front wheel and a rear wheel;
a vehicle cabin;

a floor panel constituting a floor surface of the vehicle cabin;

a front room provided in front of the vehicle cabin;

a prime mover provided behind the front room and below the floor panel;

an output shaft configured to output a driving force from the prime mover;

a propeller shaft extending in front of the prime mover and below the floor panel in a front-rear direction and configured to transmit rotational power output from the prime mover;

an air conditioner unit that is provided in the front room and through which a first refrigerant flows;

a compressor driven by power of the prime mover and configured to compress the first refrigerant; and a first pipe that connects the air conditioner unit and the compressor and through which the first refrigerant flows, wherein the floor panel is formed with a center tunnel portion formed by bending the floor panel upward in a convex shape, wherein the output shaft is provided at a position offset by a predetermined distance from a center of the vehicle in a vehicle width direction, wherein a space in which the propeller shaft is provided to be inclined in the vehicle width direction is formed below the center tunnel portion, and wherein the first pipe extends through the space in the front-rear direction.

9. The vehicle according to claim 8, wherein the vehicle further includes a second pipe extending below the floor panel in the front-rear direction, and wherein, in another predetermined cross section that traverses at least a part of the propeller shaft in the vehicle width direction, the first pipe is located on one side of the propeller shaft in the space in the vehicle width direction, and the second pipe is located on the other side of the propeller shaft in the space in the vehicle width direction.

10. The vehicle according to claim 9, wherein the vehicle further includes a radiator provided in the front room, and wherein the second pipe connects the prime mover to the radiator.

11. The vehicle according to claim 9, wherein the vehicle further includes a third pipe extending below the floor panel in the front-rear direction, and wherein, in the another predetermined cross section, the third pipe is located on the other side of the propeller shaft in the space in the vehicle width direction.

12. The vehicle according to claim 11, wherein the air conditioner unit includes an evaporator and a heater core, wherein the first pipe connects the evaporator and the compressor, and wherein the third pipe connects the heater core to the prime mover.

13. The vehicle according to claim 8, wherein the first pipe includes a rigid portion formed of metal and an elastic portion formed of an elastic member.

14. The vehicle according to claim 8, wherein the vehicle further includes a lower cover member formed of a rigid member that covers the space from below.

* * * * *